United States Patent Office 3,053,017
Patented Sept. 11, 1962

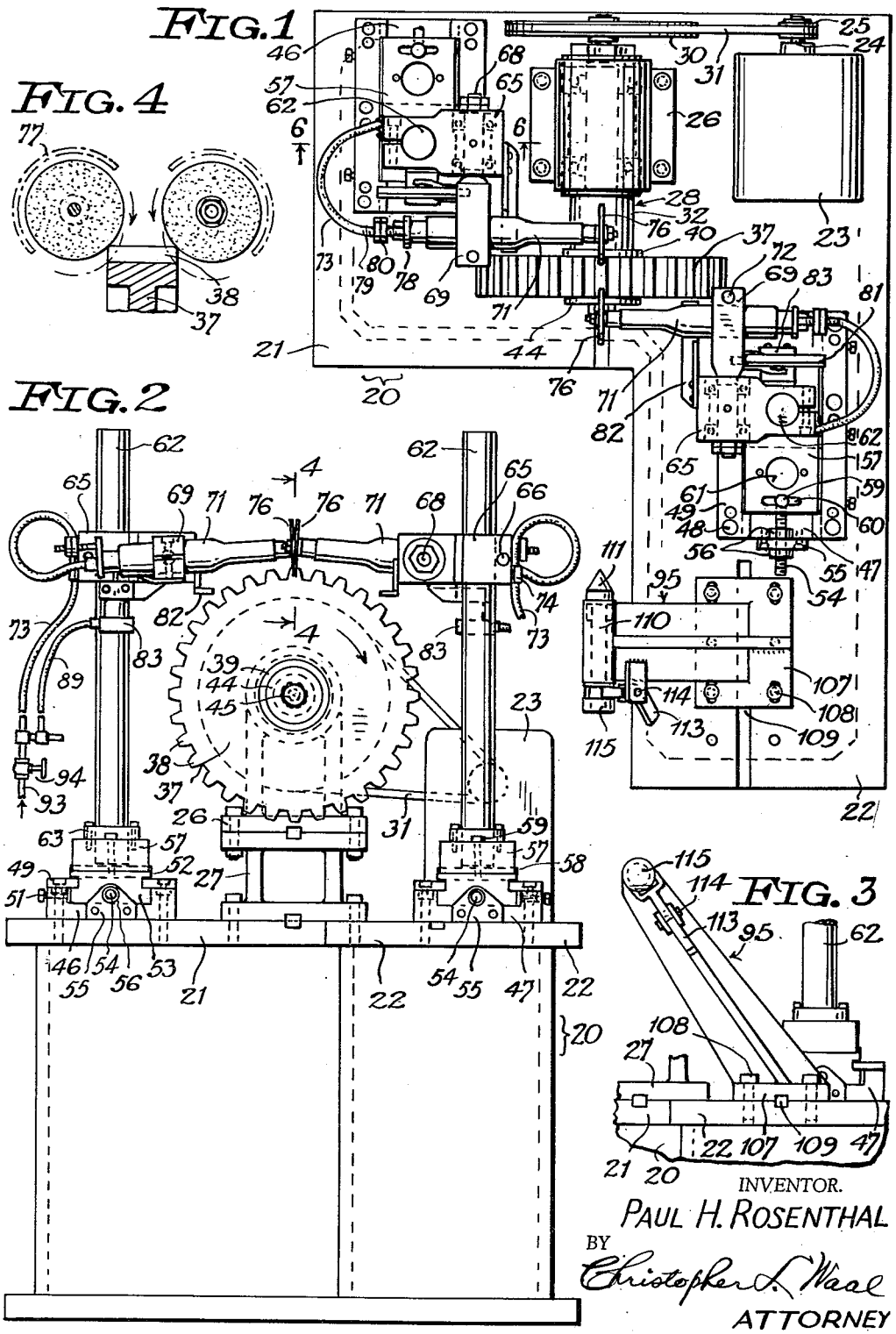

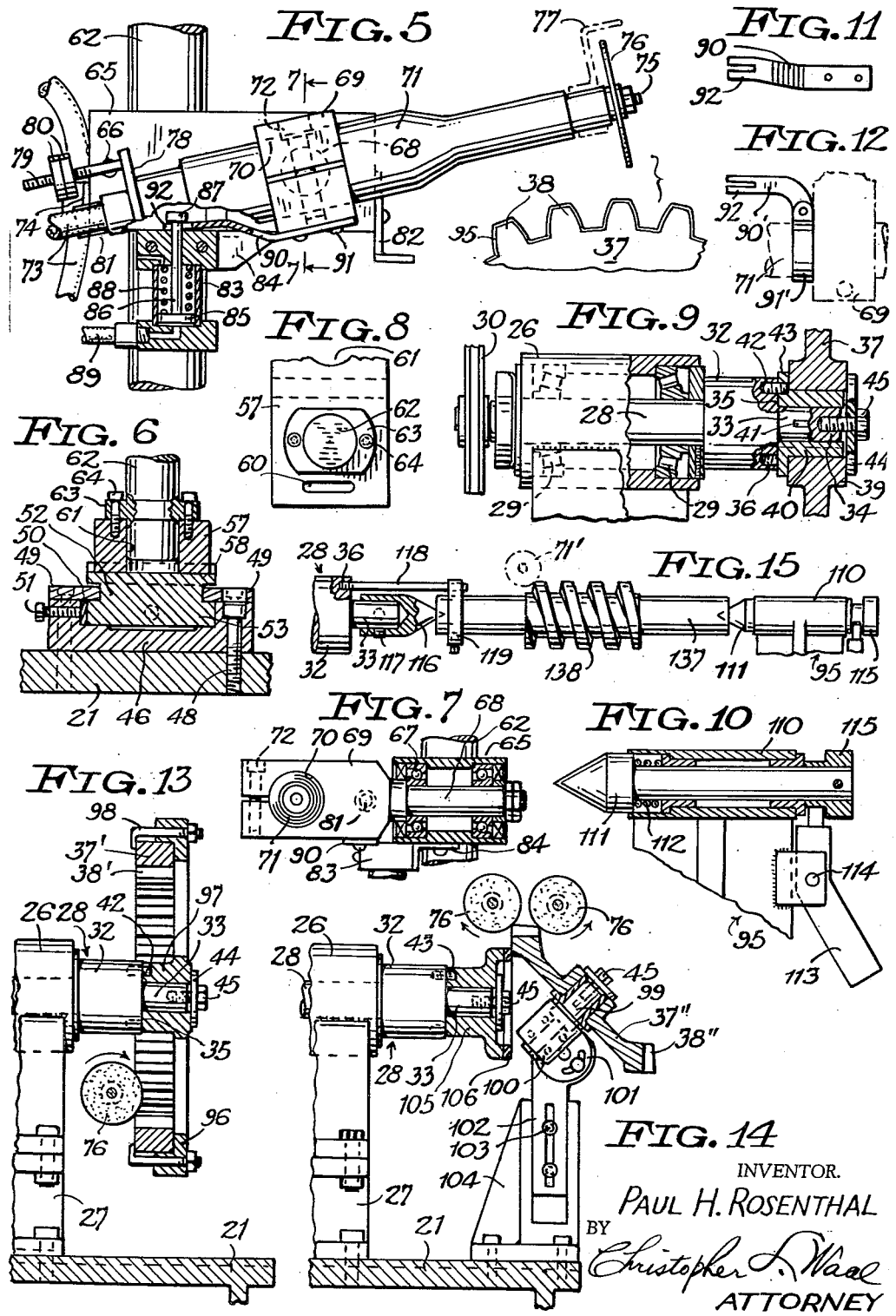

3,053,017
GEAR CHAMFERING MACHINES
Paul H. Rosenthal, West Allis, Wis., assignor to Davis
 & Thompson Company, Milwaukee, Wis., a corporation of Delaware
Filed Apr. 20, 1960, Ser. No. 23,510
11 Claims. (Cl. 51—33)

This invention relates to gear chamfering machines.

An object of the invention is to provide an improved machine of relatively simple construction for expeditiously chamfering or deburring the teeth of gears.

Another object is to provide a gear chamfering machine which can readily be adjusted to accommodate gears of different sizes and types.

Still another object is to provide a machine which will simultaneously chamber the opposite ends of gear teeth.

A further object is to provide a gear chamfering machine including rotary chamfering tool means which will be shifted out of active position at the completion of the chamfering operation or upon power failure.

The invention further consists in the several features hereinafter described and claimed.

In the accompanying drawings,

FIG. 1 is a top plan view of a gear chamfering machine constructed in accordance with the invention, parts being broken away and parts being shown in section, and an externally toothed gear to be chamfered being mounted on the machine;

FIG. 2 is a front elevational view of the machine, a tail stock thereof being omitted;

FIG. 3 is a fragmentary front elevation of the machine with the tail stock in position;

FIG. 4 is a detail sectional view taken generally on the line 4—4 of FIG. 2, a pair of chamfering grinding wheels being shown in two different positions in full and dotted lines with respect to a gear being chamfered;

FIG. 5 is an enlarged fragmentary front elevation of the left-hand rotary chamfering tool and supporting means therefor, the tool being in inactive operation with respect to the gear, and parts being broken away and parts being shown in section;

FIG. 6 is a fragmentary sectional view of supporting post means for the chamfering tool, taken generally on the line 6—6 of FIG. 1;

FIG. 7 is a detail sectional view taken generally on the line 7—7 of FIG. 5;

FIG. 8 is a detail top view of a tool-supporting post and a carriage cross slide therefor;

FIG. 9 is a fragmentary side elevational view, partly in section, of a work-supporting head stock;

FIG. 10 is a fragmentary longitudinal sectional view of a work-supporting tail stock;

FIG. 11 is a detail top view of a tool control arm;

FIG. 12 is a similar view of a modified form of control arm;

FIG. 13 is a fragmentary side elevation, partly in section, showing the machine arranged for chamfering an internally toothed gear;

FIG. 14 is a fragmentary side elevation, partly in section, showing the machine arranged for chamfering a bevel gear, and FIG. 15 is a fragmentary side elevation, partly in section, showing the head stock and tail stock of the machine carrying a worm shaft.

In the drawings, 20 designates a hollow base frame including an L-shaped horizontal table member 21 having a front extension 22 at one side of the frame. Mounted on a rear corner portion of the table member behind the front extension 22 is a motor-driven speed reducer 23 of the infinitely variable type having a rearwardly projecting horizontal output shaft 24 carrying a pulley 25. A head stock 26 is disposed at the rear central portion of the table member and is rigidly mounted on a pedestal 27 bolted to the table member. The head stock, best shown in FIG. 9, includes a horizontal spindle 28 extending parallel to the speed reducer shaft 24 and journalled in anti-friction bearings 29, such as tapered roller bearings. The reduced rear end of the spindle carries a sheave 30 which is drivingly connected by a belt 31 to the speed reducer pulley 25 and is driven thereby at an adjustable slow rate of speed. The spindle includes a cylindrical front head portion 32 with a reduced cylindrical front extension 33 having a central threaded bore 34, FIG. 9. The spindle head portion presents a flat annular abutment shoulder 35 and is provided near its periphery with a plurality of axially extending threaded openings 36 opening at the shoulder.

The head stock spindle is adapted to detachably mount thereon various types of gears or toothed work-pieces the ends of the teeth of which are to be chamfered. In FIGS. 1, 2, 4, and 9, the work-piece is in the form of a conventional spur gear 37 having external teeth 38 and a hollow hub 39. A gear-supporting adapter bushing 40 is detachably fitted on the head stock spindle extension 33 and is held thereon against relative rotation, as by a keyed connection 41 or by a drive pin 42 screwed into one of the spindle head openings 36. In some instances, the bushing includes an end flange 43 adjacent to the spindle head. The gear hub 39 slidably fits on the bushing and is frictionally clamped thereon by a washer 44 engaged by a screw 45 axially screwed into the spindle extension bore 34. The adapter bushing 40 is interchangeable with the other similar bushings of different sizes, not shown, to suit various gears which are to be chamfered.

Mounted on the table member 21 at opposite side portions thereof are a pair of rectangular channel blocks 46 and 47 of generally similar construction. The block 47 is forward of the block 46 and is disposed on the table member extension 22. Each channel block, which extends parallel to the head stock spindle, is secured to the table member as by screws 48, and carries parallel gib bars or plates 49 thereon at opposite sides to form therewith ways of T-slotted configuration. Each channel block also includes a side take-up bar 50 adjusted by screws 51. A rectangular slide block 52 is mounted in each channel block and is longitudinally grooved at opposite sides to form tongues 53 engaging under the gib plates 49. A horizontal adjusting screw 54 is anchored centrally in an end of the slide block and extends through a bracket 55 fastened to an end of the channel member, the screw carrying clamping nuts 56 engageable with the bracket. A cross slide 57 is guided on the slide block 52 by a key 58 and is clamped to the slide block by screws 59 passing through slots 60 in the cross slide.

Each cross slide 57 has formed therein a pair of vertical openings 61 spaced longitudinally thereof and selectively receiving therein the lower end of a cylindrical post or pillar 62, each post having an attaching flange 63 secured to the associated cross slide by screws 64.

Slidably mounted on each of the two spaced posts 62 is a tool-supporting block 65 which is clamped in vertically adjusted position on the post by a screw 66, the screw passing through a split portion of the block. Each block 65 has journalled therein, as by ball-bearings 67, FIG. 7, the horizontal shaft portion 68 of a rockable swivel block 69, the shaft portion being spaced inwardly from the post. The two shaft portions of the swivel blocks are disposed in generally parallel relation to the head stock spindle 28 and lie in a horizontal plane approximately tangent to the top of the work gear 37. The swivel block 69 on the rearward post extends forwardly from this post, while the swivel block on the forward post extends rearwardly from the latter post. Near its free end each swivel block 69 has a generally horizontal transverse bore 70 receiving therethrough the cylindrical body portion of a power-driven grinder head 71, such as of the air-motor type, the grinder head being clamped to the swivel block by a screw 72 passing through the split free end of the block. Each grinder head is of conventional construction per se. The outer end of each grinder head is connected to a compressed air supply hose 73, a looped portion of which is attached to the slide block 65 by a clip 74. Each grinder head has a projecting motor shaft 75 on which is detachably clamped a relatively thin grinding wheel or disk 76, and the grinding wheels of the two grinder heads both lie substantially in the vertical plane of the head stock spindle. The thickness of each grinding wheel or disk is substantially smaller than the space between adjacent teeth of the work gear. The vertical planes of the grinder head shafts 75 are substantially parallel and spaced on opposite sides of the face planes of the work gear 37, as seen in FIGS. 1 and 4, and the center of each grinding disk is spaced at an angle of about 45° from the point of contact of the disk with the adjacent end of the top tooth of the gear, as indicated in FIG. 4. In some instances, a conventional guard 77 may be provided for each grinding wheel, as by broken lines in FIGS. 4 and 5.

Each swivel-supported grinder head floats on its pivotal mounting and is slightly unbalanced in a sense which will gravitationally urge the grinding wheel into light contact with the gear teeth 38. The periphery of each floating grinding wheel or disk is engageable with the tip edges and the root edges of the ends of the gear teeth, and the peripheral portions of the opposite side faces of the wheel are engageable with the lateral edges of the teeth. The outer end of the grinding head carries an upwardly projecting radial arm 78, FIG. 5 to which is rigidly secured a threaded stem 79 extending parallel to the grinder head axis. A pair of weight-forming jam nuts 80 are threaded on the stem 79 and are shiftable therealong to adjust the degree of unbalance of the grinder head. The swivel block 69 carries a radial counterweight rod 81. The maximum downward swing of the wheel-carrying end of the grinder head is limited by a horizontal stop arm 82 secured to the block 65, the free end of the arm extending under the grinder head.

Provision is made for lifting or retracting each grinding wheel out of active position with respect to the gear when the air supply to the grinder head is shut off. An air cylinder 83, FIG. 5, is rigidly secured to the lower portion of each slide block 65 by a bracket 84 and includes a vertically movable piston 85 with an upwardly projecting rod 86 having a head 87 at its upper end. The piston is urged downwardly by a compressed coiled spring 88 in the cylinder and is lifted by air pressure supplied through a hose 89 connected to the lower end of the cylinder. A control arm 90 is secured to the lower face of the swivel block 69, as by screws 91, and has a slotted or forked free end 92 straddling the piston rod under the piston rod head 87. In the absence of air pressure in the cylinder the spring 88 pulls the slotted end of the arm 90 downwardly, thus angularly shifting the swivel block 69 about its shaft 68 to lift the grinding wheel 76 from the gear to the position seen in FIG. 5. Each grinder head air hose 73 and cylinder air hose 89 are connected to a compressed air line 93, FIG. 2, through a common control valve 94, so that opening of the valve will simultaneously admit driving or energizing air to the grinder head motor and admit air to the cylinder 83 to lift the piston rod 86, thus permitting the unbalanced grinder head to tilt (clockwise as viewed in FIG. 5) to effect engagement of the grinding wheel with the gear. By mounting the two grinder heads at opposite sides of the vertical plane of the head stock spindle, the desired direction of rotation of the grinding wheels can be obtained with the use of identical grinder heads.

The modified form of control arm 90' shown in FIG. 12 includes a laterally extending looped portion 91' which is clamped about the cylindrical body portion of the grinder head 71 adjacent to the air cylinder. The looped portion can be angularly shifted on the grinder head to adjust the elevation of the forked end 92 of the arm.

For supporting certain types of work-pieces, such as shaft-mounted gears and worm shafts, the machine is provided with a tail stock 95 which is detachably mounted on the table extension 22. The tail stock and its use are hereinafter more fully described.

In setting up the machine for use in chamfering a work gear 37 of a given diameter, width, and hub size, the compound carriages 53, 57 supporting the posts 62 are shifted along the channel blocks 46 and 47 to appropriate positions, and the tool-supporting blocks 65 are vertically adjusted on the posts to place the grinding wheels 76 in proper position with respect to the top of the gear. A suitable adapter bushing 40 is placed on the head stock spindle extension 33 to accommodate the hub of the gear, and the gear is then clamped on the bushing, as hereinbefore described. At this time each grinding wheel is in elevated or inactive position, as seen in FIG. 5, so as to avoid interference with the mounting of the gear.

The machine is then started in operation by energizing the motor-driven speed reducer 23 to rotate the gear-carrying head stock spindle 28 at a suitable slow rate of speed, and by opening the air control valve 94 to energize the grinding heads 71 and to apply spring-releasing air pressure to the air cylinders 83, whereupon the high-speed rotating grinding wheels 76 descend gently into contact with opposite ends of the uppermost gear teeth, as indicated in FIG. 4. During the slow rotation of the work gear 37, as in the direction indicated by the arrow in FIG. 2, the grinding wheels or disks of the rockably mounted floating grinder heads chamfer the edges of the tooth ends, the wheels following the contour of the teeth. During the chamfering operation, the wheels gravitationally descend along the lateral edges of a tooth of the slowly rotating work gear, and after traversing the succeeding root edges between adjacent teeth, are urged upwardly along the next lateral tooth edges by cam action of the tooth on the wheels, following which the wheels chamfer the tip edges of the tooth ends. The chamfered tooth edges are indicated by the numeral 95 in FIG. 5. In FIG. 4, the positions of the grinding wheels when chamfering the root edges of the teeth are indicated by broken lines. After one revolution of the gear, the chamfering of the gear teeth is complete at opposite ends of the teeth. The depth of chamfer can be varied by adjusting the speed of the gear-carrying head stock spindle, or by turning the spindle through two or more revolutions. Upon completion of the chamfering operation, the air supply to the grinder heads 71 and head retractor cylinders 83 is shut off by the control valve 94, and the spindle drive is stopped. The retractor springs 88 in the air cylinders immediately tilt the grinder heads to lift the grinding wheels to inactive position, as seen in FIG. 5, permitting unobstructed removal of the finished gear from the head stock spindle. The machine is then ready for mounting of the next gear to be chamfered. If the air supply should fail during a gear chamfering operation, the grinding wheels will also be tilted to inactive position, thus avoiding damage to the machine and the gear. The machine as set up in FIGS. 1, 2 and 4 may also be used for chamfering helical gears.

In FIG. 13, the machine is shown to be set up for chamfering an internally toothed gear 37', here shown to be a ring gear having teeth 38'. The gear is clamped or chucked in a cupped skeleton fixture 96 having a hub 97 detachably clamped to the head stock spindle, as by a washer 44 and screw 45, the fixture having hook bolts 98 engageable with the gear. The left-hand grinder head is lowered on its supporting post to permit contact of the grinding wheel 76 thereof with the edges of the lowermost gear teeth. The operation of the machine is the same as in FIG. 1 except that only one grinder head is used. If the gear-carrying fixture is reversed on the spindle, the right-hand grinder head is placed in operation instead, but this grinder head would have to be moved out of the way when mounting and removing the gear. If the internal gear is provided with a hub portion the fixture is not required, and if necessary an adapter bushing may be mounted on the spindle, as in FIG. 9.

In FIG. 14, the machine is set up for chamfering a bevel gear 37″ having teeth 38″. The gear is detachably clamped on an inclined ball-bearing spindle 99 carried by a housing 100 with a trunnion mounting 101 angularly adjustable on the upper portion of a post 102, the latter being clamped by screws 103 in vertically adjusted position on a vertically grooved standard 104. The standard in turn is adjustably clamped on the table member 21. The bevel gear 37″ is so positioned that the pitch line of the uppermost tooth is substantially horizontal and lies in the vertical plane of the head stock spindle. The bevel gear is suitably driven as by a hubbed wheel 105 detachably clamped to the head stock spindle and provided with an axially facing rim 106 of rubber or other friction material engaging the rim portion of the gear. The opposite ends of the gear teeth are chamfered by the grinding wheels 76, which occupy a relation to the teeth similar to that shown in FIG. 4.

The tail stock 95 includes a base 107, FIGS. 1 and 3, which is detachably mounted on the table extension 22 by screws 108 and is guided by keyed connection 109 for displacement in a direction parallel to the axis of the head stock spindle. The tail stock further includes a cylindrical barrel 110 coaxial with the head stock spindle and having rotatably mounted therein a center-forming cone-pointed spindle 111 urged forwardly by a compressed coiled spring 112 in the barrel, as seen in FIG. 10. The tail stock spindle 111 is retractable against the action of the spring by a fork-ended lever 113 pivotally carried on the tail stock at 114 and engageable with a collar 115 pinned to the rear end of the spindle. The head stock spindle extension 33 has detachably mounted thereon a cupped cone-pointed center member 116, FIG. 15, secured thereto by one or more screws 117. A worm shaft 137 to be chamfered includes a worm section 138 and is mounted between the cone-pointed center members of the head stock and tail stock. The worm shaft is driven by the head stock spindle as by a rod 118 screwed into one of the openings 36 of the head stock spindle and engaging a dog 119 secured on the worm shaft. The sharp tooth edges of the slowly rotating worm shaft are then chamfered by a manually held grinder head 71′ similar to or identical with the grinder head 71 of FIG. 5.

The tail stock 95 may also be used to support a shaft assembly, not shown, which includes a gear similar to the externally toothed gear 37 of FIG. 1 or the internally toothed gear 37′ of FIG. 13. In such case the gear teeth are chamfered by the grinding wheels 76, as hereinbefore described, during rotation of the shaft assembly by the head stock.

I claim:

1. A machine for chamfering end edges of the teeth of gears, comprising supporting means, a work holder rotatably carried by said supporting means and adapted to support and drive a work gear, means for rotating said work holder, a floatingly mounted oscillatory power-driven tool head including a grinding wheel the periphery of which is engageable with end edges of the gear teeth, the axis of said wheel extending in a generally horizontal direction transversely of the vertical axial plane of said work holder, and the periphery of said wheel being engageable with the teeth edges approximately in the vertical axial plane of said work holder, said grinding wheel being yieldably movable into and out of the intertooth spaces of the work gear during the rotation of said gear and being normally urged against said teeth edges and adapted to follow the contour of the gear teeth, the teeth of the rotating work gear forming means for controlling the inward movement of the grinding wheel of said floatingly mounted oscillatory tool head into the intertooth spaces of the gear and for urging said grinding wheel outwardly of said intertooth spaces.

2. A machine for chamfering end edges of the teeth of gears, comprising supporting means, a work holder rotatably carried by said supporting means and adapted to support and drive a work gear, means for rotating said work holder, a post carried by said supporting means laterally of the vertical axial plane of said work holder, a tool support secured to said post in vertically adjusted position therealong, an oscillatory power-driven tool head including a grinding wheel the periphery of which is engageable with end edges of the gear teeth, said tool head being pivotally carried by said support to swing floatingly on a horizontal axis the vertical plane of which is substantially parallel to the vertical axial plane of said tool holder, the axis of said grinding wheel extending transversely of said swing axis, and said grinding wheel being yieldably movable into and out of the intertooth spaces of the work gear during the rotation of the gear and being normally urged against said teeth edges and adapted to follow the contour of the gear teeth.

3. A machine for chamfering end edges of the teeth of gears, comprising supporting means, a work holder rotatably carried by said supporting means and adapted to support and drive a work gear, means for rotating said work holder, a pair of posts carried by said supporting means on opposite sides of the vertical axial plane of said work holder, tool supports secured to said respective posts in vertically adjusted position therealong, a pair of oscillatory power-driven tool heads each including a grinding wheel, the peripheries of said wheels being engageable with the opposite end edges of the gear teeth, said tool heads being pivotally carried by said respective tool supports and each being swingable floatingly about a horizontal axis the vertical plane of which is substantially parallel to the vertical axial plane of said tool holder, the axis of each grinding wheel extending transversely of the swing axis, and said grinding wheels being yieldably movable into and out of the intertooth spaces of the work gear during the rotation of the gear and being normally urged against said teeth edges and adapted to follow the contour of the gear teeth.

4. A machine for chamfering end edges of the teeth of gears, comprising supporting means, a work holder rotatably carried by said supporting means and adapted to support and drive a work gear, means for rotating said work holder, a post carried by said supporting means laterally of the vertical axial plane of said work holder, said post being adjustable along said supporting means in a direction parallel to the vertical axial plane of said work holder and being secured to said supporting means in adjusted position, a tool support secured to said post in vertically adjusted position therealong, an oscillatory power-driven tool head including a grinding wheel the periphery of which is engageable with end edges of the gear teeth, said tool head being pivotally carried by said support to swing floatingly on a substantially horizontal axis the vertical plane of which is substantially parallel to the vertical axial plane of said tool holder, the axis of said grinding wheel extending transversely of said swing axis, and said grinding wheel being yieldably movable into and out of the intertooth spaces of the work gear during the rotation of the gear and being normally urged against said teeth edges and adapted to follow the contour of the gear teeth.

5. A machine for chamfering end edges of the teeth of gears, comprising supporting means, a work holder rotatably carried by said supporting means for rotation about a horizontal axis and adapted to support and drive a work gear, means for rotating said work holder, a pair of power-driven tool heads including respective grinding wheels the axes of which extend in substantially parallel planes at opposite sides of the gear position and transversely of the vertical axial plane of said work holder, and means for pivotally supporting said tool heads for independent rocking displacement about axes substantially parallel to the work holder axis, the plane of each grinding wheel lying approximately in the vertical axial plane of the rotatable work holder, said grinding wheels being yieldably movable into and out of the intertooth spaces of the work gear during the rotation of the gear and being normally urged to effect engagement of the peripheries of said grinding wheels with the opposite end edges of the gear teeth, and said work gear during its rotation causing said grinding wheels to follow the contour of the gear teeth, the teeth of the rotating work gear forming means for controlling the inward movement of the yieldably movable grinding wheel of each pivotally supported tool head into the intertooth spaces of the gear and for urging said grinding wheel outwardly of said intertooth spaces.

6. A machine for chamfering end edges of the teeth of gears, comprising supporting means, a work holder rotatably carried by said supporting means and adapted to support and drive a work gear, means for rotating said work holder, a floatingly mounted oscillatory power-driven tool head including a grinding wheel the periphery of which is engageable with end edges of the gear teeth adjacent to the vertical axial plane of said work holder, said wheel being yieldably movable into and out of the intertooth spaces of the work gear during the rotation of the gear and being normally urged against said teeth edges and adapted to follow the contour of the gear teeth, the teeth of the rotating work gear forming means for controlling the inward movement of the grinding wheel of the floatingly mounted oscillatory tool head into the intertooth spaces of the gear and for urging said grinding wheel outwardly of said intertooth spaces, and means for retracting said tool head to inactive position with respect to the gear.

7. A machine for chamfering end edges of the teeth of gears, comprising supporting means, a work holder rotatably carried by said supporting means and adapted to support and drive a work gear, means for rotating said work holder, a floatingly mounted oscillatory power-driven tool head including a grinding wheel the periphery of which is engageable with end edges of the gear teeth, said wheel being yieldably movable into and out of the intertooth spaces of the work gear during the rotation of the gear and being normally urged against said teeth edges and adapted to follow the contour of the gear teeth, and means responsive to cessation of driving power to said tool head for retracting said tool head to inactive position with respect to the gear.

8. A machine for chamfering end edges of the teeth of gears, comprising supporting means, a work holder rotatably carried by said supporting means and adapted to support and drive a work gear, means for rotating said work holder, a floatingly mounted oscillatory pneumatically-driven tool head including a grinding wheel the periphery of which is engageable with end edges of the gear teeth, said wheel being yieldably movable into and out of the intertooth spaces of the work gear during the rotation of the gear and being normally urged against said teeth edges and adapted to follow the contour of the gear teeth, and pneumatically controlled means responsive to cessation of the flow of driving air to said tool head for retracting said tool head to inactive position with respect to the gear.

9. A machine for chamfering end edges of the teeth of gears, comprising supporting means, a work holder rotatably carried by said supporting means for rotation about a horizontal axis, said work holder being adapted to suport and drive a work gear, means for rotating said work holder, a pair of power-driven tool heads including respective grinding wheels, the axes of said wheels extending in substantially parallel planes at opposite sides of the gear position and at a higher elevation than the gear, the peripheries of said wheels being engageable with opposite ends of the uppermost gear teeth approximately in the vertical axial plane of said work holder, and means for rockably supporting said tool heads to swing floatingly about axes substantially parallel to the work holder axis, said grinding wheels being yieldably movable into and out of the intertooth spaces of the work gear during the rotation of the gear and being normally downwardly urged against said teeth edges and adapted to follow the contour of the gear teeth.

10. A machine for chamfering end edges of the teeth of gears, comprising a housing, a power-driven spindle rotatably carried by said housing and adapted to support and drive a work gear, means for rotating said spindle, said housing being angularly adjustable to place the spindle at different inclinations, a floatingly mounted power-driven tool head including a rotatable grinding wheel the periphery of which is engageable with end edges of the gear teeth adjacent to the vertical axial plane of the spindle, the axis of said wheel extending transversely of the vertical axial plane of said spindle, said grinding wheel being yieldably movable into and out of the intertooth spaces of the work gear during the rotation of the gear and being normally urged against said teeth edges and adapted to follow the contour of the gear teeth, the teeth of the rotating work gear forming means controlling the inward movement of the grinding wheel of said floatingly mounted tool head into the intertooth spaces of the gear and for urging said grinding wheel outwardly of said intertooth spaces.

11. A machine for chamfering end edges of the teeth of gears, comprising supporting means, a work holder rotatably carried by said supporting means and adapted to support and drive a work gear, means for rotating said work holder, a floating rockably mounted power-driven tool including a grinding wheel the periphery of which is engageable with the gear teeth edges, the axis of said grinding wheel extending transversely of the vertical axial plane of said holder, and the grinding wheel axis being spaced outwardly from the contact region of the wheel periphery with the gear, a radius connecting said wheel axis and contact region extending at an angle of approximately 45° to the plane of the end face of the gear tooth being ground, said grinding wheel being yieldably movable into and out of the intertooth spaces of the work gear during the rotation of the work gear and being normally urged against said gear teeth edges, and the teeth of the rotating gear forming means for controlling the inward movement of said grinding wheel into the intertooth spaces of the gear and for urging said grinding wheel outwardly of said intertooth spaces.

References Cited in the file of this patent

UNITED STATES PATENTS

| | | |
|---|---|---|
| 903,106 | Phelps | Nov. 3, 1908 |
| 2,560,967 | Lohutko | July 17, 1951 |
| 2,860,453 | Frey | Nov. 18, 1958 |